A. LAURITZEN & J. F. NIELSEN.
POTATO DIGGER.
APPLICATION FILED JULY 27, 1910.
1,014,493.
Patented Jan. 9, 1912.
2 SHEETS—SHEET 1.
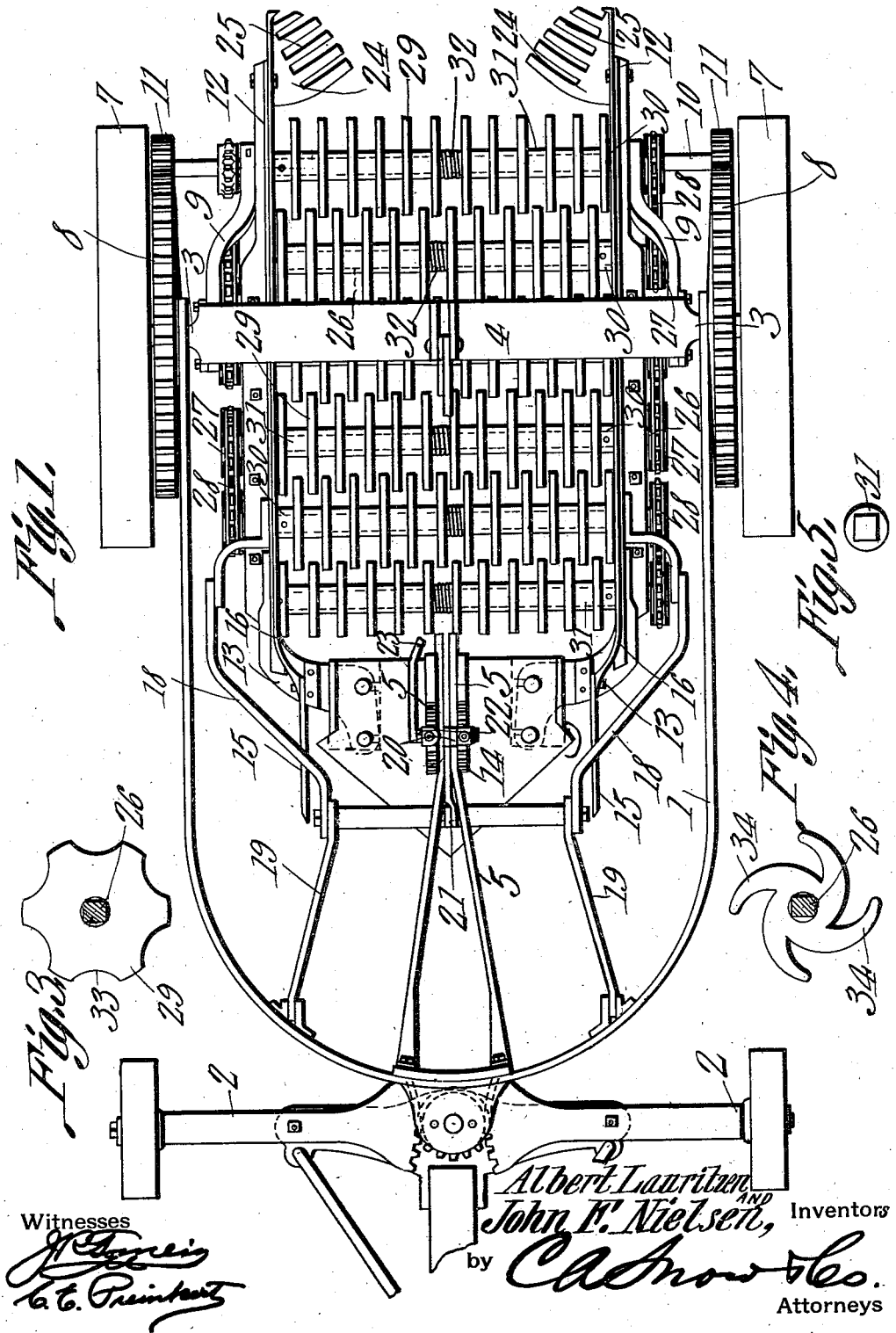
Witnesses
Albert Lauritzen
John F. Nielsen, Inventors
by C. A. Snow & Co.
Attorneys A. LAURITZEN & J. F. NIELSEN.
POTATO DIGGER.
APPLICATION FILED JULY 27, 1910.
1,014,493.
Patented Jan. 9, 1912.
2 SHEETS—SHEET 2.
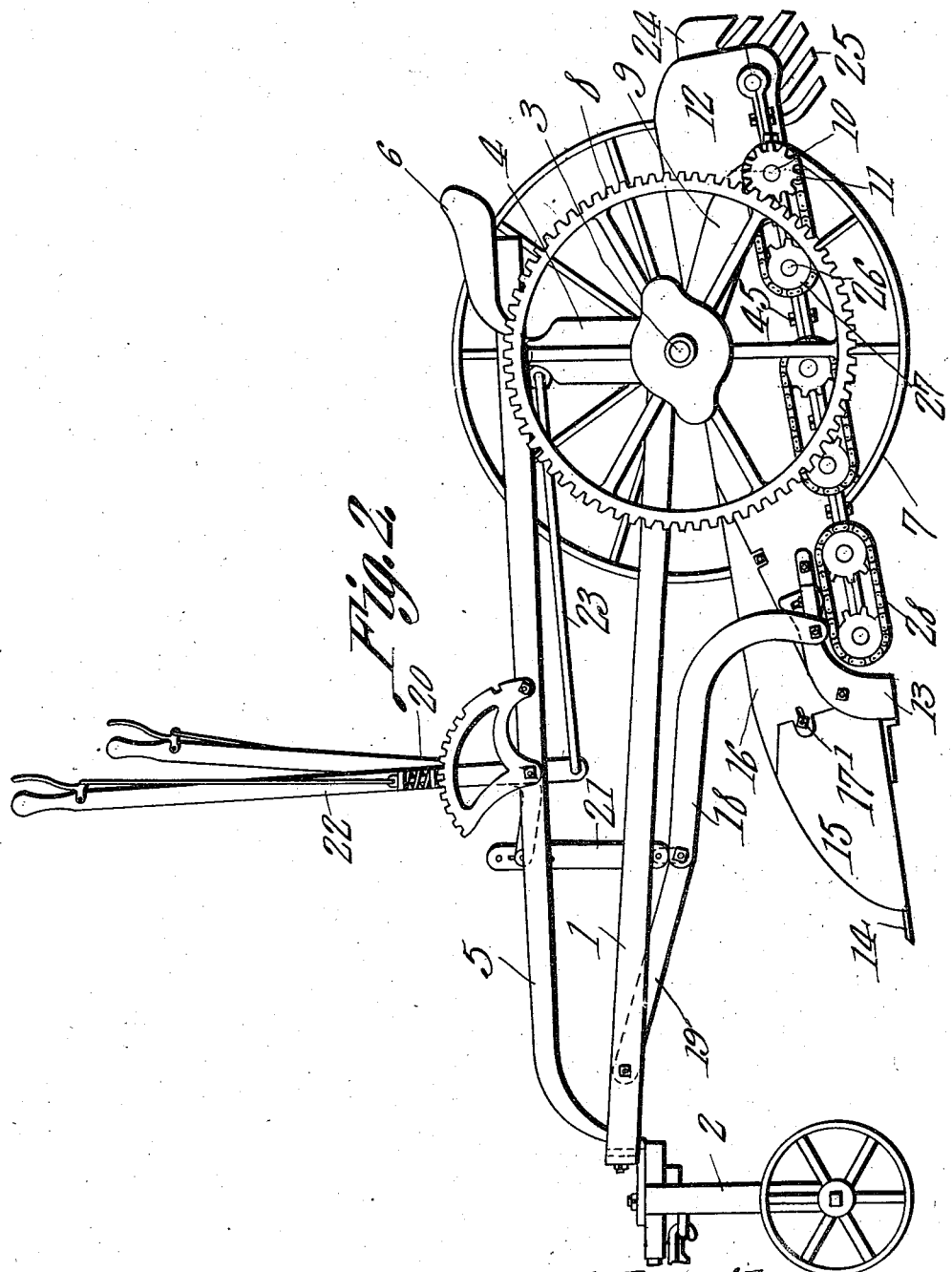

UNITED STATES PATENT OFFICE.

ALBERT LAURITZEN, OF CHARLOTTE, AND JOHN FRED NIELSEN, OF GREENVILLE, MICHIGAN.

POTATO-DIGGER.

1,014,493. Specification of Letters Patent. Patented Jan. 9, 1912.

Application filed July 27, 1910. Serial No. 574,123.

*To all whom it may concern:*

Be it known that we, ALBERT LAURITZEN and JOHN FRED NIELSEN, citizens of the United States, residing, respectively, at Charlotte and Greenville, in the counties of Eaton and Montcalm, State of Michigan, have invented a new and useful Potato-Digger, of which the following is a specification.

This invention relates to a potato digger and consists in the novel construction and arrangement of its parts as hereinafter shown and described.

The object of the invention is to provide a potato digger of simple structure which includes a grid made up of a series of rotating members adapted to operate upon the potatoes to sift the soil from the same. Also means are provided for permitting the rotating members to move away from each other when they encounter large stones and other irresistible objects so that the said objects may pass through between the members without injuring the same.

In the accompanying drawings:—Figure 1 is a top plan view of the potato digger. Fig. 2 is a side elevation of the same one of the supporting wheels removed. Fig. 3 is a side elevation of one form of rotary member adapted to be used in the grid. Fig. 4 is a side elevation of a modified form of rotary member adapted to be used in the grid. Fig. 5 is an end view of a sleeve used upon the digger.

The potato digger includes a frame 1 which is mounted at its forward end upon a wheel-supported truck 2 and which is supported at its rear end upon gudgeons 3 carried by an arched cross piece 4. Bars 5 are secured at their forward ends to the forward portions of the frame 1 and the rear end portions of the said bars extend back over the intermediate portion of the arched cross piece 4 and carry a seat 6. Traction wheels 7 are journaled upon the gudgeons 3 and carry spur gears 8. The arched cross piece 4 is provided at its ends with rearwardly disposed arms 9 in which a shaft 10 is journaled. Pinions 11 are fixed to the ends of the shaft 10 and mesh with the spur gears 8. A trunk 12 is pivotally mounted at its rear end portion upon the shaft 10 and is provided at the forward ends of its sides with downwardly and inwardly disposed arms 13. A digging share 14 is mounted upon the inner end portions of the arms 13 and the said share is downwardly inclined with relation to the trunk 12. Colter blades 15 are mounted upon the arms 13 adjacent the side edges of the share 14 and may serve as means for cutting roots at the edges of a row of potatoes. Guide plates 16 are mounted upon the upper edges of the forward portions of the sides of the trunk 12 and are adjustably connected at their forward ends by means of bolt and slot connections 17' with the rear portions of the colters 15. Arms 18 are attached to the sides of the forward portion of the trunk 12 and are pivotally connected at their forward ends with links 19 which in turn are pivotally connected at their forward ends with the frame 1. A lever 20 is fulcrumed upon the bars 5 and its working end is operatively connected with the forward ends of the arms 18 by means of a link 21. Therefore it will be seen that by swinging the lever 20 the forward end portion of the trunk 12 and its attachment may be raised or lowered. A lever 22 is also fulcrumed upon the bars 5 and its working end is operatively connected with the intermediate portion of the arch 4 by means of a link 23. Therefore it will be seen that by swinging the lever 22 the arch 4 may be swung upon the gudgeons 3 and the arms 9 may be raised or lowered and thus means are provided for raising or lowering the rear portion of the trunk 12. Plates 24 are secured to the inner surfaces and at the rear ends of sides of the trunk 12 and are provided with inwardly and downwardly inclined spaced fingers 25.

A series of shafts 26 are journaled for rotation at their end portions in the sides of the trunk 12 and a sprocket wheel 27 is mounted upon each shaft 26. Endless sprocket chains 28 pass around the sprocket wheels 27 of the adjacent shafts 26 and 10. The sprocket chains 28 are arranged in staggered relation at the opposite sides of the trunk 12 that is to say a sprocket chain 28 at one side of the trunk 12 which operatively connects two adjacent sprocket wheels 27 is in a direction transversely of the trunk opposite the disconnected sprocket wheels 27 at the opposite side of the trunk and vice versa.

A series of rotating disks or members 29 are mounted upon each shaft 26 and also upon the shaft 10. The intermediate portions of the shafts 10 and 26 are non-circular and the said disks are provided with circular openings which receive the intermediate portions of the shafts whereby the said disks are slidably mounted upon the shafts and may also remain at rest while the shafts rotate. The terminal disks of each series are spaced from the sides of the trunk 12 by means of collars 30 fixed upon the shafts and the disks are spaced from each other by sleeves 31 which have non-circular openings which snugly receive the intermediate non-circular portions of the shafts 26 and 10. At points intermediate the ends of the shafts 10 and 26, the adjacent disks 29 are held apart by means of coiled springs 32 which surround the shafts and bear at their opposite ends against the adjacent disks. The object of this structure will be explained hereinafter. The disk 29 may be in the form as illustrated in Fig. 3 wherein the said disks are provided with peripheral serrations 33 or the disks may be in the form as illustrated in Fig. 4 wherein they are provided with tangentially disposed fingers 34.

As the machine is drawn along a row of potatoes the vines and roots are cut in the manner as indicated and the digging share 14 passes under the potatoes and elevates the same together with the top soil upon the rotating disks 29. The upper portions of the said disks are turning in the direction opposite to that in which the machine is traveling and consequently the potatoes are elevated along the trunk 12 and at the same time are agitated and the soil is shaken and sifted from the same. Should a stone or other irresistible object be carried up with the potatoes and deposited upon the edges of the disks 29 the said disks which bear the weight of the stone may move laterally along their respective shafts against the tension of the springs 32 and thus additional space will be made through which the stone may pass without injuring the disks, which might occur if the disks were rigidly mounted. Therefore, should a small stone become lodged between the disks, the positively driven collars would eject them without damage to any portions along the machine. When the potatoes pass over the disks 29 carried by the shaft 10 those potatoes in the vicinity of the sides of the trunk 12 encounter the fingers 25 of the plates 24 and are directed toward the surface of the ground in a line approximately between the sides of the trunk 12.

Having described the invention what is claimed is:—

1. In a potato digger a trunk, a shaft journaled for rotation in the trunk and having a non-circular intermediate portion, a series of disks mounted upon the non-circular portion of the shaft and being free to slide thereon, means for spacing the said disks from each other, and a resilient means located between the intermediate disks of the series for resiliently holding the said disks in frictional engagement with the spacing means.

2. In a potato digger, a trunk, a shaft journaled for rotation therein and having a non-circular intermediate portion, disks slidably mounted upon the non-circular portion of the shaft, means for spacing said disks from each other, and a coiled spring surrounding the intermediate portion of the shaft and bearing at its ends against the sides of adjacent disks and adapted to resiliently hold the said disks in frictional engagement with the spacing means.

In testimony that we claim the foregoing as our own, we have hereto affixed our signatures in the presence of witnesses.

ALBERT LAURITZEN.
JOHN FRED NIELSEN.

Witnesses:
- J. C. SMITH,
- WM. H. BROWNE.